US009291184B2

(12) United States Patent
Zabielski et al.

(10) Patent No.: US 9,291,184 B2
(45) Date of Patent: Mar. 22, 2016

(54) ELECTRICAL CONNECTING DEVICE

(71) Applicant: DELPHI TECHNOLOGIES, INC., Troy, MI (US)

(72) Inventors: Pawel Zabielski, Cracow (PL); Adam Wozniak, Dobczyce (PL)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 13/928,660

(22) Filed: Jun. 27, 2013

(65) Prior Publication Data

US 2014/0003863 A1 Jan. 2, 2014

(30) Foreign Application Priority Data

Jun. 29, 2012 (EP) .................................... 12174395

(51) Int. Cl.

| | |
|---|---|
| ***B25G 3/18*** | (2006.01) |
| ***F16B 21/00*** | (2006.01) |
| ***F16D 1/00*** | (2006.01) |
| ***F16B 17/00*** | (2006.01) |
| ***H01R 13/629*** | (2006.01) |

(52) U.S. Cl.

CPC .......... *F16B 17/00* (2013.01); *H01R 13/62938* (2013.01); *Y10T 403/595* (2015.01)

(58) Field of Classification Search

CPC .............. F16B 17/00; H01R 13/62938; Y10T 403/32549; Y10T 403/32557; Y10T 403/32581; Y10T 403/32591; Y10T 403/59; Y10T 403/591; Y10T 403/595; Y10T 403/598

USPC .............. 403/112, 113, 116, 117, 321, 322.1, 403/322.4, 324; 439/157, 372

See application file for complete search history.

(56) References Cited

U.S. PATENT DOCUMENTS

| | | | | |
|---|---|---|---|---|
| 4,762,362 | A * | 8/1988 | Brunn | 297/26 |
| 5,230,635 | A * | 7/1993 | Takenouchi et al. | 439/157 |
| 5,443,393 | A * | 8/1995 | Okumura et al. | 439/157 |
| 5,474,462 | A * | 12/1995 | Yamanashi | 439/157 |
| 5,603,624 | A * | 2/1997 | Taguchi et al. | 439/157 |
| 6,755,673 | B2 * | 6/2004 | Fukushima et al. | 439/157 |
| 7,275,943 | B2 * | 10/2007 | Ohtaka et al. | 439/157 |
| 7,520,765 | B2 * | 4/2009 | Fukatsu et al. | 439/157 |
| 7,872,206 | B2 * | 1/2011 | Matsunaga et al. | 200/335 |
| 2009/0188342 | A1 * | 7/2009 | Cymbal et al. | 74/493 |

* cited by examiner

*Primary Examiner* — Gregory Binda
*Assistant Examiner* — Nahid Amiri
(74) *Attorney, Agent, or Firm* — Robert J. Myers

(57) ABSTRACT

A connecting device comprises a first component, a second component which can be connected to the first component by insertion one in the other, and a coupling lever which is mounted movably on the first component and which is adjustable from an open position to a closed position and has coupling elements which cooperate with coupling elements of the first and second components and are designed in such a way that, by an adjusting movement of the coupling lever out of the open position into the closed position, the first and second components can be transferred from a loose state to a fixed state.

13 Claims, 4 Drawing Sheets

ELECTRICAL CONNECTING DEVICE

CROSS-REFERENCE TO RELATED APPLICATION

This application claims the benefit under 35 U.S.C. §19(a) of European Patent Application EP 2174395.9, filed in the European Patent Office on Jul. 29, 2012, the entire disclosure of which is hereby incorporated by reference.

TECHNICAL FIELD OF THE INVENTION

The invention generally relates to an electrical connection device and more particularly relates to an electrical connection device having a coupling lever.

BACKGROUND OF THE INVENTION

An example of a connecting device according to the prior art is illustrated in FIG. 1. Connecting devices serve on the one hand to make it easier to connect two components, in particular components from the field of electronics, and on the other hand at the same time to make it more reliable. This is typically achieved by the fact that the connecting device 11P has a coupling lever 17P, the actuation of which presses firmly together the components 13P, 15P which are initially inserted one in the other only loosely and incompletely, until they are completely inserted one in the other. This is done by the fact that the coupling lever 17P is mounted movably on one component 13P and can engage the other component 15P via coupling elements 19P-27P, as a result of which the actuation of the lever is diverted for firmer insertion of the components one in the other and the components 13P, 15P are also connected in form-locking relationship. The use of the coupling lever 17 further has the advantage that, on account of the lever action, only weak forces have to be applied for rigid connection of the components, and they act specifically on the components.

A disadvantage of coupling levers of this kind, on the other hand, is that their length requires a lot of space compared with small electronic components, and this space must be free around the components for the coupling lever as well as for actuation of the coupling lever. In particular in electronics, the available space is typically limited. Another disadvantage of ordinary coupling levers is their freely movable mounting on one of the components, as a result of which, for example during transport or during assembly, they can occupy any state between the open position and the closed position, so that before connection of one component to the other component they must first be moved into their open position. Also it is often not guaranteed that, before the coupling lever has reached its closed position, the two components are reliably locked together.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with a first embodiment of this invention, a connecting device is provided. The connecting device includes a first component having a coupling element and a second component having a coupling element, wherein said second component can be connected to the first component by insertion one in the other. The connecting device also includes a coupling lever which is mounted movably on the first component and which is movable from an open position to a closed position and has coupling elements which cooperate with coupling elements of the first and second components and are designed in such a way that, by an adjusting movement of the coupling lever out of the open position into the closed position, the first and second components can be transferred from a loose state to a fixed state. The first and second components are completely inserted one in the other and rigidly connected to each other in the fixed state and are incompletely inserted one in the other and loosely connected to each other in the loose state. The first and second components can be transferred from the loose state to a safety state in which the first and second components are prevented from being released from each other by the adjusting movement of the coupling lever out of the open position into a safety position provided in the course between the open position and the closed position. The position of the first and second components relative to each other in the safety state does not differ from their position relative to each other in the loose state. The adjusting movement of the coupling lever out of the open position into the safety position is a substantially translational movement.

In a second embodiment of the present invention, the adjusting movement of the coupling lever out of the safety position into the closed position relative to the first component is a substantially rotational movement.

In a third embodiment of the present invention, the coupling lever is prevented from rotating in the open position by cooperation with the first component and with the second component in the loose state thereof.

In a fourth embodiment of the present invention, the coupling lever is prevented from performing a translational movement in the closed position.

In a fifth embodiment of the present invention, latch means are provided between the coupling lever and the first component and the second component which have to be overcome on reaching and leaving the open position, the safety position, and the closed position.

In a sixth embodiment of the present invention, the coupling elements of the first component comprise a pin. The coupling elements of the coupling lever comprise a slot having a first and a second end, in which the pin engages. The pin and the slot are designed in relation to each other in such a way that the coupling lever is rotatable about the pin when the pin is located at the second end of the slot, and not rotatable when the pin is located at a first end of the slot.

In a seventh embodiment of the present invention, the coupling elements of the first component comprise a guide peg. The coupling elements of the coupling lever comprise an associated guide groove in which the guide peg engages. A guide groove comprises a straight section and an arcuate section. The safety position of the coupling lever the guide peg is arranged at a junction between the straight and arcuate sections.

In an eighth embodiment of the present invention, the arcuate section of the guide groove is at a substantially constant distance from the first end of the slot.

In a ninth embodiment of the present invention, a length of the straight section of the guide groove is substantially shorter than a length of the arcuate section.

In a tenth embodiment of the present invention, a latch means provided between the first component and the coupling lever are designed as narrow portions of the guide groove, as a result of which the guide peg latches in at one end of the guide groove, at another end of the guide groove or at the junction between the arcuate and straight sections.

In an eleventh embodiment of the present invention, the coupling elements of the second component comprise a coupling peg. The coupling elements of the coupling lever comprise an associated coupling groove in which the coupling peg engages. A coupling groove comprises a straight section and an arcuate section. The safety position of the coupling lever the coupling peg is arranged at the junction between the straight and arcuate sections.

In a twelfth embodiment of the present invention, the arcuate section of the coupling groove, starting from the junction between the arcuate and straight sections, is at a decreasing distance from the first end of the slot.

In a thirteenth embodiment of the present invention, a length of the straight section of the coupling groove is substantially shorter than a length of the arcuate section.

In a fourteenth embodiment of the present invention, the slot, the straight section of the guide groove and the straight section of the coupling groove are oriented in the same direction and have the same length.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
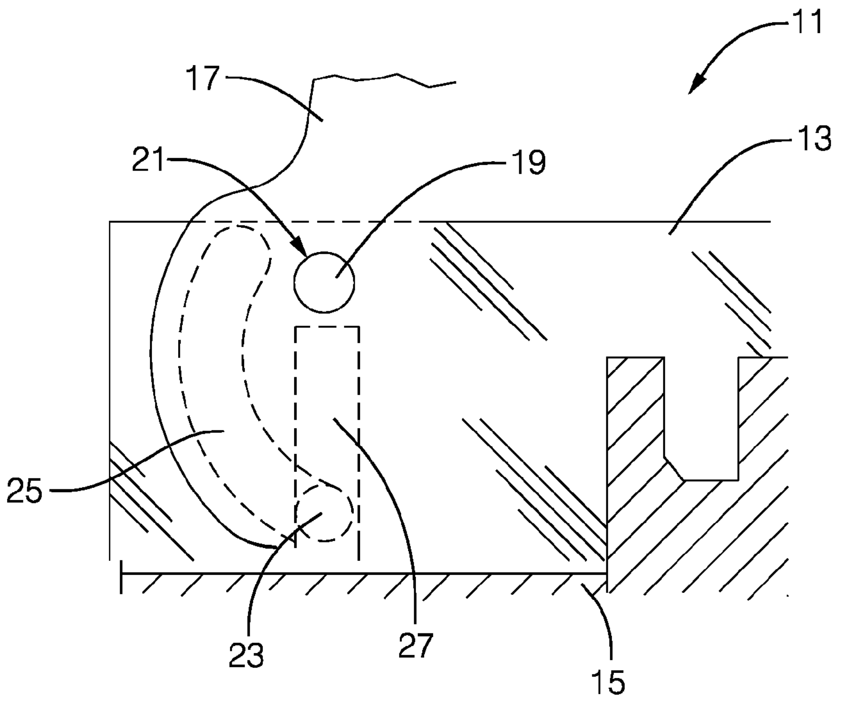
FIG. 1 PRIOR ART
FIG. 1 is a schematic side view a connecting device according to the prior art.

The invention relates to a connecting device which comprises a first component, a second component which can be connected to the first component by insertion one in the other, and a coupling lever mounted movably on the first component. The coupling lever is adjustable from an open position to a closed position and has coupling elements which cooperate with coupling elements of the first and second components. The coupling elements are in this case designed in such a way that, by an adjusting movement of the coupling lever out of the open position into the closed position, the first and second components can be transferred from a loose state to a fixed state, wherein the components in the fixed state are completely inserted one in the other and rigidly connected to each other and in the loose state by contrast they are incompletely inserted one in the other and loosely connected to each other.

It is the object of the invention to provide a connecting device of the kind mentioned hereinbefore which is simple, compact and cheap to make, the actuation of which takes up little space, and which allows easy and reliable assembly.

The object is achieved by a connecting device having the characteristics of claim 1 and particular by an adjusting movement of the coupling lever out of the open position into a safety position provided in the course between the open position and the closed position, the first and second components can be transferred from the loose state to a safety state in which the components are prevented from being released from each other, wherein their position relative to each other in the safety state does not differ from their position relative to each other in the loose state, and wherein the adjusting movement of the coupling lever out of the open position into the safety position is substantially a purely translational movement.

In other words, upon actuation of the coupling lever, in order to firmly insert the two components one in the other and to reliably connect them to each other in form-locking relationship, the adjusting movement is divided into two partial movements, wherein a first partial adjusting movement leads from the open position into a defined safety position, and a second partial adjusting movement leads from this safety position into the closed position. In the process, the first partial adjusting movement from the open position to the safety position serves in particular to already hold the two components, which are still incompletely inserted one in the other and loosely connected to each other, in form-locking relationship and prevent them from being released from each other. In the safety state which is reached in this way, however, the two components are still only incompletely inserted one in the other and loosely connected to each other, as they were previously in the loose state. The safety state of the two components differs from the loose state substantially only in that the coupling lever is adjusted out of the open position into the safety position. The two components, on the other hand, are in the process at most moved insignificantly relative to each other. Here, of course, one cannot exclude the possibility of the components being displaced slightly towards each other. However, during this first adjusting movement there is no provision for concrete, firmer insertion of the two components one in the other for the purpose of a substantial contribution to reaching the fixed state by applying forces necessary for this purpose.

The advantage of a safety position between the open position and the closed position of the coupling lever, and the resulting safety state of the components lies in particular in that the first partial adjusting movement from the open position to the safety position already leads to reliable locking together of the components. Thus for example between the first partial adjusting movement and the second partial adjusting movement there can be a break or pause in the adjusting movement, without the risk of release of the components. Further, the first partial adjusting movement out of the open position into the safety position and the second partial adjusting movement out of the safety position into the closed position can advantageously be coordinated with each other in such a way that, due to their progression, the whole adjusting movement takes up particularly little space. This can be achieved for example by the fact that the courses of the two partial adjusting movements are aligned with each other in a special manner, in particular specially angled.

Furthermore, the adjusting movement of the coupling lever out of the open position into the safety position is essentially a purely translational movement. If the first partial adjusting movement is a particularly short translational movement, adjustment of the coupling lever into the safety position can be effected for example in a particularly simple manner by briefly pressing on the coupling lever in the direction of the translational movement.

Furthermore, it is advantageous if the adjusting movement of the coupling lever out of the safety position into the closed position relative to the first component is substantially a purely rotational movement. If the second partial adjusting movement is a purely rotational movement, the coupling lever is pivoted about a given fixed pivot point, which enables the lever action to be used to firmly insert the two components one in the other. The pivot point of the coupling lever can in this case be determined by a point on the first component, at which the coupling lever is mounted movably on the first component. The second partial adjusting movement of the coupling lever is then only relative to the first component a purely rotational movement, as the components advantageously move towards each other as a result of the second partial adjusting movement, in order to be more firmly inserted one in the other.

In the case of a first partial adjusting movement of the coupling lever which is a purely translational movement, and a second partial adjusting movement of the coupling lever which is a purely rotational movement, the partial adjusting movements advantageously differ not only functionally insofar as one brings about the safety state of the components and the other brings about the fixed state, but also in that they basically exhibit different types of movement or directions of movement. In this way the two courses of movement are distinctly separate from each other, so that the different positions of the coupling lever and states of the components can be reliably adjusted.

According to a further advantageous embodiment, the coupling lever is prevented from rotating in the open position by cooperation with the first component and/or by cooperation with the second component in the loose state of the first and second components. If therefore the two components are already loosely inserted one in the other in their loose position, in this embodiment the coupling lever cannot be rotated. Then, for example, only a purely translational movement is possible for adjusting the coupling lever out of the open position into the safety position. In this way specific positive driving of the coupling lever which is basically mounted movably on the first component can be achieved. Prevention of rotation can in this case be achieved by cooperation with the first component and in particular by cooperation with the second component, so that locking is caused for example directly as a result of the fact that the first and second components are already loosely inserted one in the other.

In a similar way it may further be advantageous if the coupling lever is prevented from performing a translational movement in the closed position. In this case it is then ensured that the coupling lever can be caused to leave the closed position not by a translational movement, but for example only by a rotational movement. By this means too, a defined course of movement is guaranteed upon actuation of the coupling lever.

In one embodiment which combines the above-mentioned embodiments, connection and release of the two components can be effected in the following sequence. First the components are loosely inserted one in the other and so transferred to their loose state. As a result the coupling lever is prevented from performing a translational movement, so that, as a first partial adjusting movement for transfer of the coupling lever out of its open position into the safety position, only a translational movement is possible. Due to this sliding of the coupling lever into the safety position, the two components are prevented from being released from each other and are therefore then in the safety state. The second partial adjusting movement for transfer of the coupling lever out of the safety position into the closed position is then a purely rotational movement by which, utilizing leverage forces, the two components are firmly inserted one in the other and so transferred to their fixed state. It is then possible to leave the closed position only by a repeated, but then oppositely directed rotational movement of the coupling lever, in order to reach the safety position again. As a result the two components, again utilizing leverage forces, are pushed apart again. In the safety position of the coupling lever, however, they are still prevented from being released from each other. Only by a subsequent translational movement of the coupling lever out of the safety position into the open position, are the components released again and are then in their loose state, so that they can finally be completely released from each other.

In one advantageous embodiment, between the coupling lever and the first component and/or between the coupling lever and the second component are provided latch means which have to be overcome on reaching and/or leaving the open position, the safety position and/or the closed position. In other words, these latch means can make it necessary for a certain pressure to actuate the coupling lever at many points. This pressure may, referred to the two partial adjusting movements, have to be applied in particular at the beginning or end of a partial movement, that is, on leaving or reaching a certain position of the coupling lever. As a result of latch means of this kind, in particular the open position, the safety position and/or the closed position of the coupling lever can be protected against accidental actuation. Further, latching into or out of a position serves as haptic feedback to the actuating person, who can recognize from this that a certain position has been reached or left.

In a further embodiment it is provided that the coupling elements of the first component comprise a pin and that the coupling elements of the coupling lever comprise a slot having a first and a second end, in which the pin engages, wherein the pin and the slot are designed in relation to each other in such a way that the coupling lever is rotatable about the pin when the pin is located at the first end of the slot, and not rotatable when the pin is located at the second end of the slot. In particular, the pin of the first component and the slot of the coupling lever can be used for movably mounting the coupling lever on the first component. Cooperation of the pin and slot basically enable both translational movements and rotational movements. In the case of translational movements, for example the pin can be guided from one end of the slot to the other end of the slot. The possibility of a rotational movement of the coupling lever may in particular depend on where in the slot the pin is located at the time. Advantageously, in this case pin and slot can cooperate as a result of their respective shape in such a way that at one end of the slot a rotational movement of the coupling lever is possible, whereas at the other end it is not possible. In order to guarantee a reliable hold of the coupling lever on the first component, the pin and the slot may further be designed in such a way that the pin cannot leave the slot, for example by the fact that the pin at one end has a wide portion which cannot be passed through the slot or out of it, or cannot at any point of the slot.

Furthermore, it may be advantageous if the coupling elements of the first component comprise a guide peg and the coupling elements of the coupling lever comprise an associated guide groove in which the guide peg engages, wherein the guide groove comprises a straight section and an arcuate section, and wherein in the safety position of the coupling lever the guide peg is arranged at a junction between the straight and arcuate sections. Cooperation of the guide peg of the first component with the guide groove of the coupling lever can, as a positive drive, define the whole adjusting movement of the coupling lever. Advantageously, by dividing the guide groove into a straight section and an arcuate section, the sequence of a translational movement and a rotational movement can be achieved in a simple manner. In this case in particular the safety position of the coupling lever can correspond precisely to the junction between the straight and arcuate sections, so that actuation from the open position to the safety position is a purely translational movement, and actuation from the safety position to the closed position is a purely rotational movement.

Preferably, the arcuate section of the guide groove is at a substantially constant distance from the first end of the slot. The arcuate section of the guide groove is then a circle segment, so that an adjusting movement of the coupling lever which is positively driven by the guide peg in the guide groove is a rotational movement with the first end of the slot as a fixed pivot point. Consequently, preferably a rotational movement of this kind is possible only if the pin of the first component is located at this first end of the slot and so defines a fixed pivot point relative to the first component for the rotational movement of the coupling lever.

In a particularly preferred embodiment, the length of the straight section of the guide groove is substantially shorter than the length of the arcuate section, preferably shorter than half, in particular shorter than one-third of the length of the arcuate section. As a result, a translational movement of the coupling lever corresponding to the straight section can be substantially shorter than a rotational movement of the coupling lever defined by the arcuate section. In particular the length of the straight section of the guide groove can correspond to only approximately twice the diameter of the guide peg and/or be oriented in such a way that the coupling lever needs to be pressed only slightly in the direction of the first component for adjustment to its safety position. As a result of dimensions and orientations of this kind, the connecting device can take up particularly little space.

In a further advantageous embodiment, latch means provided between the first component and the coupling lever are designed as narrow portions of the guide groove, as a result of which the guide peg latches in at one end of the guide groove, at the other end of the guide groove and/or at the junction between the arcuate and straight sections. The design of latch means as narrow portions of a groove in which a peg is guided constitutes a particularly simple application structurally. By suitable choice of the placement of such narrow portions, i.e. in particular at ends of the guide groove or at the junction between the arcuate and straight sections, which can form a kink in the course of the guide groove, given positions such as the open position, the safety position and/or the closed position of the coupling lever can be clearly defined and emphasized in a particularly simple manner. Also, these positions can be protected by the latch means against accidental adjustment.

In a further advantageous embodiment, the coupling elements of the second component comprise a coupling peg and the coupling elements of the coupling lever comprise an associated coupling groove in which the coupling peg engages, wherein the coupling groove comprises a straight section and an arcuate section, and wherein in the safety position of the coupling lever the coupling peg is arranged at a junction between the straight and arcuate sections. The second component can therefore, corresponding to the above cooperation of the guide peg of the first component with the guide groove of the coupling lever, have a coupling peg which cooperates with a coupling groove of the coupling lever. Whereas cooperation of the guide peg and guide groove in particular serves for positive driving of the coupling lever, cooperation of the coupling peg and coupling groove serves instead for firmly inserting the first and second components one in the other. For this purpose, by adjustment of the coupling lever, the coupling peg can first be encompassed by the coupling groove in such a way that the second component is already prevented from being released from the first component.

Also, further adjustment of the coupling lever can guide the coupling peg in the coupling groove in such a way that, by means of the coupling peg, the second component is pulled tighter into the first component.

Furthermore, it is advantageous if the arcuate section of the coupling groove, starting from the junction between the arcuate and straight sections, is at a decreasing distance from the first end of the slot. Due to this course of the arcuate section of the coupling groove relative to the first end of the slot, a rotational movement of the coupling lever about the first end of the slot can lead to the coupling peg of the second component in the coupling groove being brought closer to the first end of the slot. For this purpose the coupling peg can in particular also be guided in a coupling receptacle of the first component. The coupling peg can then in all cases be arranged only at the point where the coupling receptacle and the coupling groove intersect. The adjusting movement of the coupling lever out of the safety position into the closed position moves the point of intersection of the coupling groove and the coupling receptacle preferably in such a way that the coupling peg is pulled deeper into the coupling receptacle and consequently the second component is pulled tighter into the first component.

Due to this mechanism, actuation of the coupling lever utilizing the lever action can be diverted to a movement of the second component relative to the first component, as a result of which the force acting between the components can be well controlled. Depending on the direction of movement, in this case the second component is inserted more firmly in the first component or at least partially released from it. Further, like the guide groove, the coupling groove too can have narrow portions as latch means for latching of the coupling peg at certain points of the coupling groove.

It is particularly preferred if the length of the straight section of the coupling groove is substantially shorter than the length of the arcuate section, preferably shorter than half, in particular shorter than one-third of the length of the arcuate section. What was stated above on the advantages of the corresponding lengths of the sections of the guide groove applies accordingly to the advantages of a short length of the straight section of the coupling groove, compared with the length of the arcuate section.

In a particularly preferred embodiment, the slot, the straight section of the guide groove and the straight section of the coupling groove are oriented in the same direction and have the same length. Due to this orientation and length corresponding to each other, the slot, the straight section of the guide groove and the straight section of the coupling groove can together define the first partial adjusting movement of the coupling lever out of the open position into the safety position, which is a purely translational movement. While the slot and the straight section of the guide groove define the interaction of the coupling lever with the first component along which the coupling lever is guided, cooperation of the straight section of the coupling groove with the coupling peg of the second component can lock the second component to the first component. The two components are then in the safety state, from which the second partial adjusting movement can follow in order to transfer the components finally to the fixed state.

The arrangement of the slot, the guide groove and/or the coupling groove on the coupling lever, and of the pin, the guide peg and/or the coupling peg on the first or second component, can in each case be inverted in alternative embodiments, so that the slot and/or the guide groove are therefore provided on the first component, the coupling groove on the second component, and/or the pin, the guide peg and/or the coupling peg on the coupling lever.

Preferably, the coupling lever can be designed as a U-shaped piece with two parallel arms, wherein the coupling elements of the coupling lever can in each case be provided in pairs with one coupling element on one arm and the other coupling element on the other arm.

Furthermore, it is preferred if the coupling lever in the closed position is rotated by less than 90° relative to the open position, preferably less than 80°, in particular less than 70°. As small as possible an angular adjustment of the coupling lever here has a particularly advantageous effect on the space occupied by the connecting device.

The connecting device can easily and reliably connect a first component to a second component. These components can be, for example, electronic components, plugs and sockets as well as a plurality of other components. In particular, the first component can also be a cover element for the second component, for example for covering fuses.

Further, it is to be clarified that, even when "coupling elements" in the plural are mentioned, in particular the coupling elements of the second component, but also those of the first component and of the coupling lever may comprise only one coupling element.

Below, the invention is further illustrated with the aid of the embodiments shown in the drawings.

FIG. 1 shows in a schematic side view a connecting device 11 known in the state of the art and having a first component 13 and a second component 15 (not shown in full), which are loosely inserted one in the other, with sides complementary to each other. The state shown therefore corresponds to the loose state of the first and second components 13, 15. The first component 13 as the cover element is placed on top of the second component 15. A coupling lever 17 is mounted rotatably on the first component 13. The mounting is effected by the cooperation of a pin 19 of the first component 13 with a hole 21 in the coupling lever 17. The coupling lever 17 is in its open position, in which a coupling peg 23 of the second component 15 is introduced into a coupling groove 25 of the coupling lever 17. By pivoting the coupling lever 17 about the pivot point defined by the pin 19, the coupling peg 23 is guided in the coupling groove 25. At the same time the coupling peg 23 is limited in its movement by a coupling receptacle 27 in the first component 13. Due to the cooperation of the coupling groove 25 of the coupling lever 17 and the coupling receptacle 27 of the first component 13, the adjusting movement of the coupling lever 17 leads to the coupling peg 23 being pulled tight on the pin 19. As a result the first component 13 and the second component 15 are inserted further one in the other and transferred to a fixed state.

Figure 2:
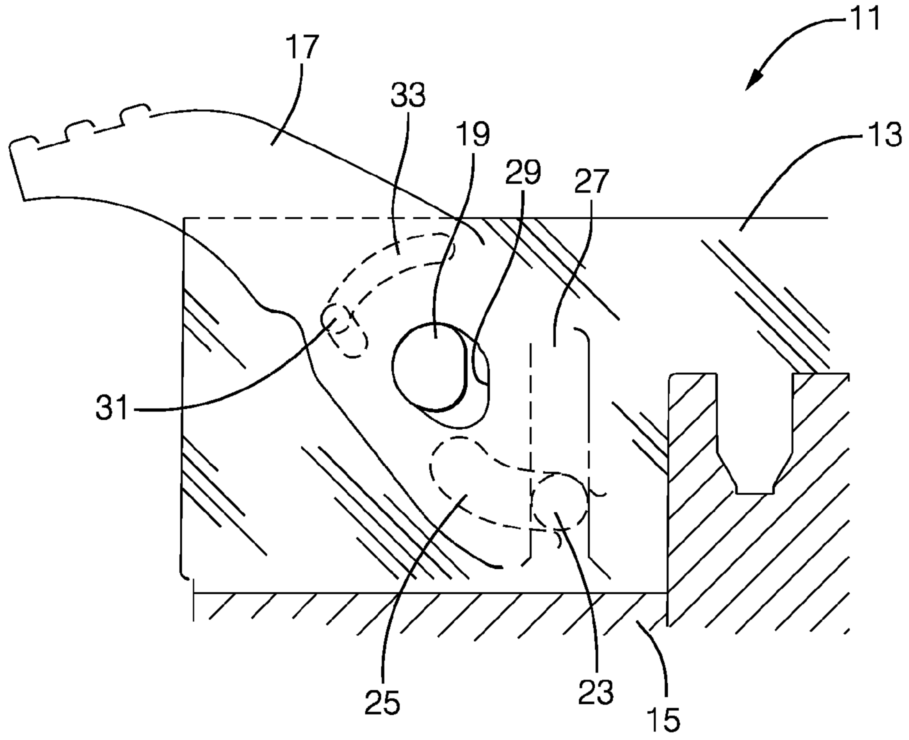
FIG. 2 is a schematic side view a connecting device in accordance with one embodiment.

FIG. 2 illustrates a non-limiting example of a connecting device 11 according to the invention in a schematic side view. The connecting device 11 comprises a second component 15 (not shown in full) and a first component 13 which, as the cover element, is placed on top of the second component 15 in such a way that the first and second components 13, 15 are, to begin with, still incompletely inserted one in the other. The first component 13 has, on the side shown, a pin 19 which engages in a slot 29 in a coupling lever 17 arranged on the first component 13. The coupling lever 17 further has a coupling groove 25 into which a coupling peg 23 of the second component 15 is introduced. The coupling peg 23 of the second component 15 is moreover located in a coupling receptacle 27 of the first component 13. As additional coupling elements between the coupling lever 17 and the first component 13, the first component 13 has a guide peg 31 which is arranged in a guide groove 33 of the coupling lever 17, and in this way limits in a defined manner and so positively drives the movement of the coupling lever 17. The manner of operation of the embodiment shown in FIG. 2 is shown more clearly in FIGS. 3 and 4.

Figure 3:
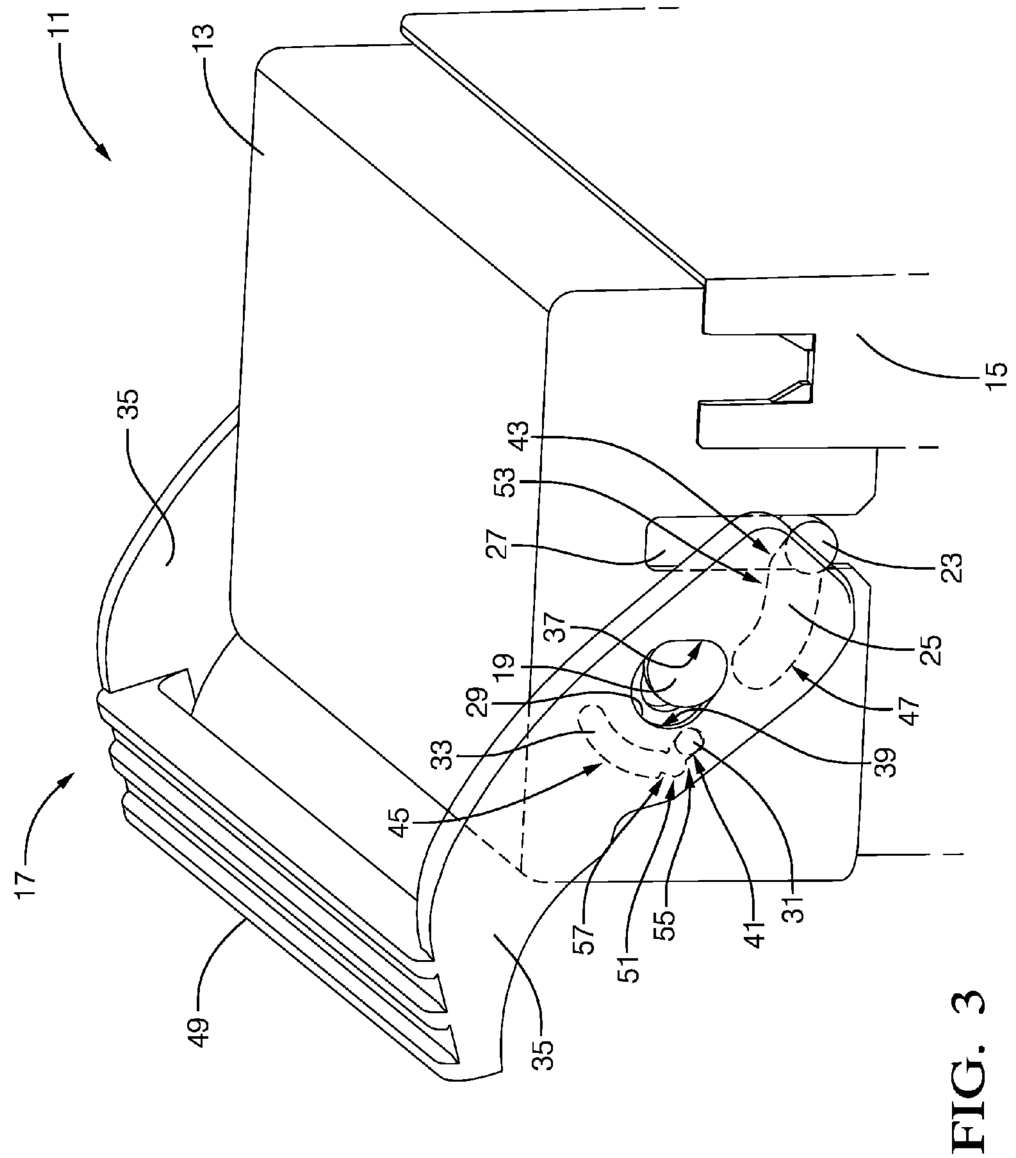
FIG. 3 is perspective view of the connecting device of FIG. 2 wherein the first and second components are in the loose state and the coupling lever is in the open position in accordance with one embodiment.

FIG. 3 shows a schematic three-dimensional view of the connecting device 11 shown in FIG. 2, wherein the first and second components 13, 15 are in the loose state and the coupling lever 17 is in the open position. The coupling lever 17 is in this case designed as a U-shaped piece with two parallel arms 35 in each of which are located a slot 29, a guide groove 33 and a coupling groove 25 (for the rear parallel arm 35, the components 29, 33, 25 are not shown).

In the open position of the coupling lever 17 which is shown, the pin 19 is located at the first end 37 of the slot 29. The pin has a substantially round cross-section with a flattened side. The first end 37 of the slot 29 is shaped accordingly, so that in this position a rotation of the coupling lever 17, in particular anticlockwise, is prevented. Rotation is additionally prevented by the fact that the coupling peg 23 is already partially introduced into the coupling groove 25.

The coupling groove 25 and the guide groove 33 each have a straight section 41, 43 and an adjoining arcuate section 45, 47, wherein the straight sections 41, 43 are the same length and oriented in the same direction as the slot 29. It is therefore possible to adjust the coupling lever 17 by pressing on an actuating section 49 of the coupling lever 17 which serves as a handle, according to the direction and length of the straight sections 41, 43 and of the slot 29, in a direction towards the first and second components 13, 15.

Figure 4:
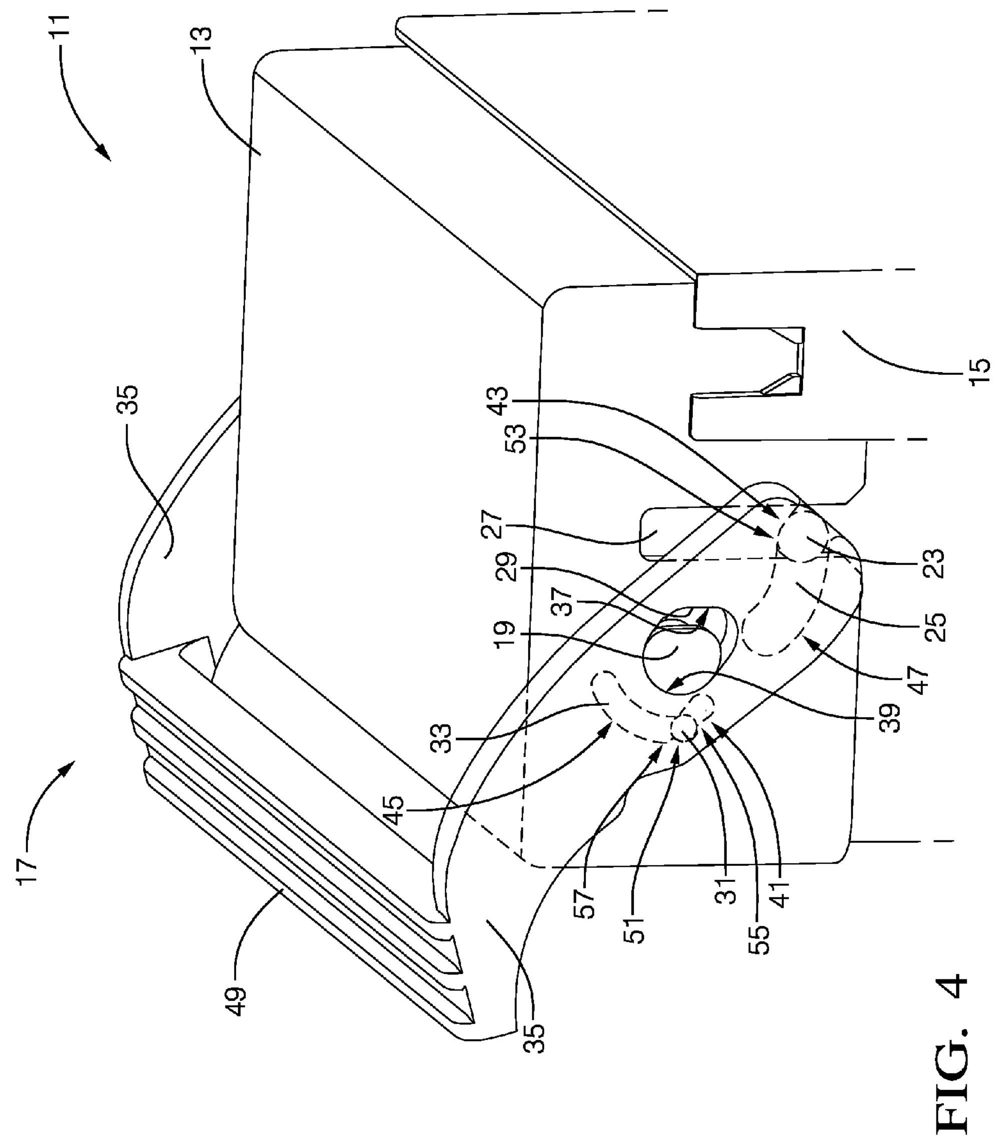
FIG. 4 is perspective view of the connecting device of FIG. 2 wherein the coupling lever is in the safety position in accordance with one embodiment.

FIG. 4 shows a schematic three-dimensional view of the connecting device 11 shown in FIG. 2, wherein the first and second components 13, 15 are in the loose state and the coupling lever 17 is in the safety position. Adjustment of the coupling lever 17 out of the open position into the safety position is a purely translational movement and leads to the pin 19 being transferred from the first end 37 to the second end 39 of the slot 29, which, by contrast with the first end 37, is round, so that cooperation of the pin 19 with the slot 29 no longer prevents rotation of the coupling lever 17.

Further, by adjustment of the coupling lever 17, the guide groove 33 and the coupling groove 25 are guided along in the guide peg 31 or coupling peg 23 in such a way that the coupling and guide pegs 23, 31 are now located in the first and second junctions 51, 53 of the coupling and guide grooves 25, 33. The result of this is in particular that the coupling peg 23 of the second component 15 is surrounded by the coupling groove 25 of the coupling lever 17 in such a way that the second component 15 is protected against release from the first component 13. The first and second components 13, 15 are consequently in their safety state, which, with respect to the position of the first and second components 13, 15 relative to each other, does not differ from the loose state shown in FIG. 3. The straight section 41 of the guide groove 33 has, between one of its ends which corresponds to the open position of the coupling lever 17, and its other end which corresponds to the first junction 51 and hence the safety position of the coupling lever 17, a first narrow portion 55 which acts as a latch means. Both during adjustment of the coupling lever 17 from the open position to the safety position and vice versa, the guide peg 31 therefore latches in the respective end of the straight section 41 of the guide groove 33. A second narrow portion 57 is provided in the arcuate section 45 of the guide groove 33, by which the latch means is always operative when the lever leaves or reaches the first junction 51 between the straight section 41 and the arcuate section 45.

From the safety position shown in FIG. 4, the coupling lever 17 can then be adjusted to the closed position by a purely rotational movement about the pin 19 of the first component 13 as the pivot point in an anticlockwise direction. This rotation comprises an angle of approximately 70°, so that the actuating section 49 in the closed position of the coupling lever 17 abuts almost flush against one side (on the left in the drawings) of the combination of first and second components 13, 15. Adjustment to the closed position is effected with positive driving by the guide peg 31 in the arcuate section 45 of the guide groove 33. At the same time the coupling peg 23 of the second component 15 is introduced both closer to the slot and further into the coupling receptacle 27 by cooperation of the guide groove 33 of the coupling lever on the one hand and with the coupling receptacle 27 of the first component 13 on the other hand. In this way, by rotation of the coupling lever 17 utilizing the lever action, the first and second components 13, 15 are inserted more firmly one in the other, so that, when the coupling lever 17 reaches the closed position in which the guide peg 31 and the coupling peg 23 have reached the end of the respective arcuate section 45, 47 of the coupling and guide grooves 25, 33, the first component 13 and the second component 15 are firmly inserted in their fixed state one in the other and connected to each other in form-locking relationship via the coupling lever 17.

For release of the first component 13 from the second component 15, reversal of the movement is effected initially with a rotational movement of the coupling lever 17 out of the closed position into the safety position, followed by adjustment of the coupling lever 17 by pulling briefly out of the safety position into the open position, as a result of which first of all the first and second components 13, 15 are pushed apart into the loosely connected loose state and ultimately released, so that they can then be detached from each other.

Figure 5C:
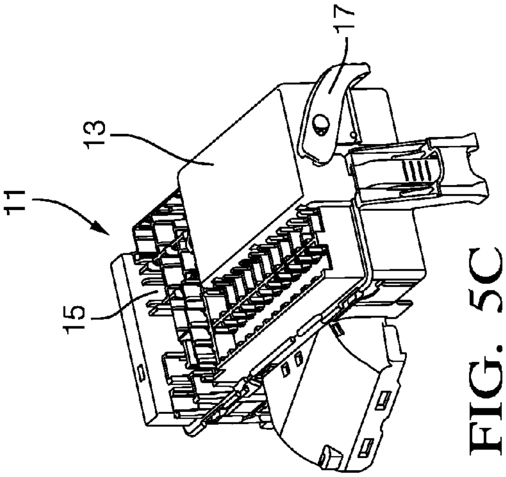
FIG. 5C is perspective view of a connecting device wherein the first and second components are firmly inserted one in the other and connected to each other in form-locking relationship by the coupling lever in accordance with one embodiment.
Figure 5B:
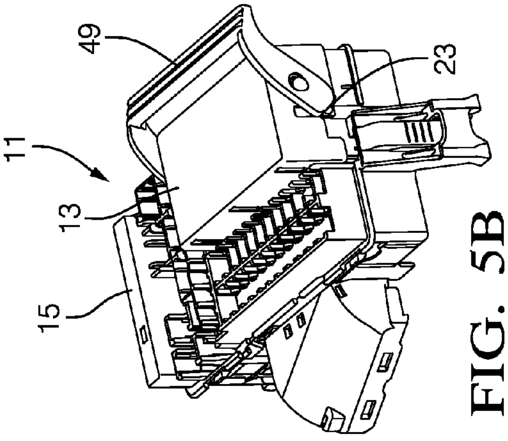
FIG. 5B is perspective view of a connecting device wherein the first and second components are inserted one in the other loosely and are in a loose state in accordance with one embodiment.
Figure 5A:
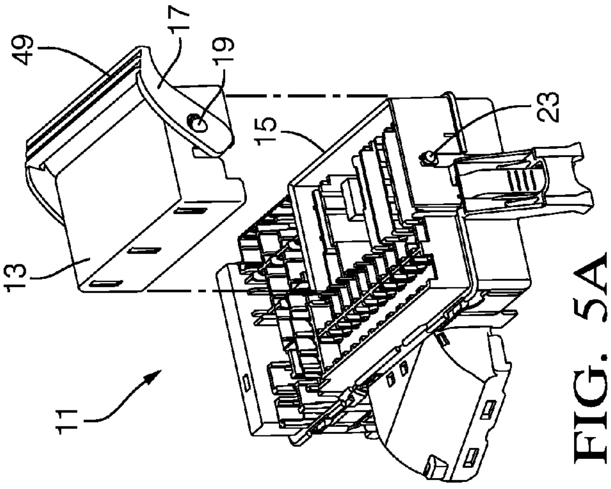
FIG. 5A is perspective view of a connecting device wherein the first and second components are released from each other in accordance with one embodiment.

In FIGS. 5A to 5E, a further embodiment of the connecting device 11 according to the invention is shown in different three-dimensional views. Here, FIG. 5A shows the connecting device with first and second components 13, 15 released from each other, wherein the coupling lever 17 is mounted movably on a pin 19 of the first component 13 and is in its open position. The coupling peg 23 can be seen on the second component 15. The additional coupling elements, the coupling groove 25, the guide peg 31 and the guide groove 33, are concealed between the coupling lever and the first component 13 and are not shown.

FIG. 5B shows the same connecting device 11 from the same viewing angle as FIG. 5A, wherein however, by contrast, the first and second components 13, 15 are inserted one in the other loosely and consequently are in the loose state. The coupling lever 17 continues to be in the open position, but already abuts by the open end of the coupling groove 25 (not shown) against the coupling peg 23.

FIG. 5C shows the connecting device 11 again from the same viewing angle as FIG. 5A in the fixed state of the first and second components 13, 15, in which they are firmly inserted one in the other and connected to each other in form-locking relationship by the coupling lever 17. The coupling lever 17 for this purpose is in its closed position, in which it is rotated through approximately 70° from the open position and from the safety position (the latter is not shown in FIGS. 5A to 5E), and with its actuating section 49 abuts to a large extent flush against a side surface formed by the first and second components 13, 15 inserted one in the other, as can be seen more clearly in FIGS. 5D and 5E.

Figure 5E:
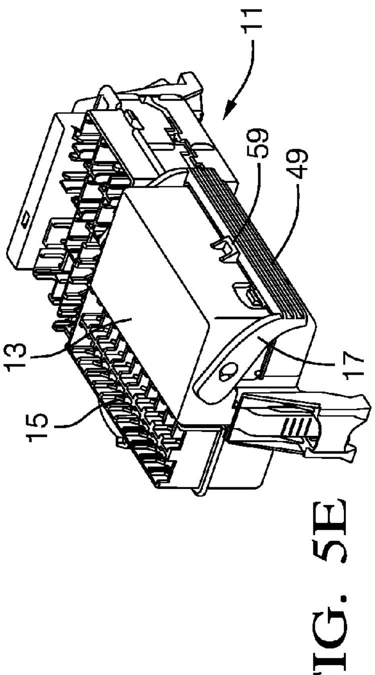
FIG. 5E is perspective view of the connecting device of FIG. 5C rotated approximately 90° in accordance with one embodiment.
Figure 5D:
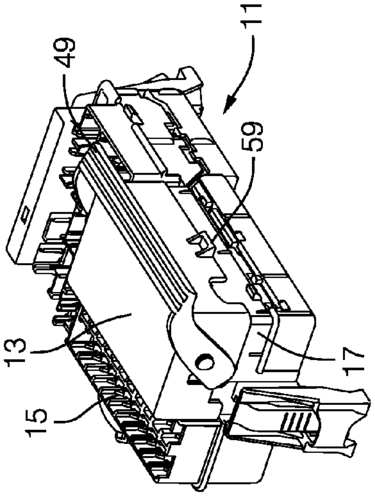
FIG. 5D is perspective view of the connecting device of FIG. 5B rotated approximately 90° in accordance with one embodiment.

FIGS. 5D and 5E correspond to the states of the connecting device 11 shown in FIGS. 5B and 5C, the device being shown here from a viewing angle rotated approximately 90° to FIGS. 5A-5C. In these views a lateral latch extension 59 protruding from the first component 13 can be seen. Upon adjustment of the coupling lever 17 to its closed position, it latches in under the lateral latch extension 59 on reaching the closed position and is then protected against adjustment from the closed position. This latching makes a further contribution to reliable connection of the first and second components 13, 15.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

LIST OF REFERENCE NUMBERS

11P Connecting Device (prior art)
13P First Component (prior art)
15P Second Component (prior art)
17P Coupling Lever (prior art)
19P Pin (prior art)
21P Hole (prior art)
23P Coupling Peg (prior art)
25P Coupling Groove (prior art)
27P Coupling Receptacle (prior art)
11 Connecting Device
13 First Component
15 Second Component
17 Coupling Lever
19 Pin
21 Hole
23 Coupling Peg
25 Coupling Groove
27 Coupling Receptacle
29 Slot
31 Guide Peg
33 Guide Groove
35 Arm
37 First End
39 Second End
41 Coupling Groove Straight Section
43 Guide Groove Straight Section
45 Guide Groove Arcuate Section
47 Coupling Groove Arcuate Section

49 Actuating Section
51 First Junction
53 Second Junction
55 First Narrow Portion
57 Second Narrow Portion
59 Latch Extension

We claim:

1. An electrical connecting device, comprising:

a first electrical connector having a first coupling element;

a second electrical connector having a second coupling element, wherein said second electrical connector can be connected to the first electrical connector by insertion one in the other; and a coupling lever which is movably mounted on the first electrical connector and which is movable from an open position to a safety position and to a closed position and has a third coupling element which cooperates with the first and second coupling elements, wherein the first and second electrical connectors are incompletely inserted one in the other and loosely connected to each other in the loose state, are incompletely inserted one in the other and prevented from being released from each other in a safety state, and are completely inserted one in the other and rigidly connected to each other in the fixed state, wherein a position of the first and second electrical connectors relative to each other in the loose state does not differ from a position of the first and second electrical connectors relative to each other in the safety state, wherein the first and second electrical connectors can be transferred from the loose state to a safety state by a translational adjusting movement of the coupling lever out of the open position into the safety position provided in the course between the open position and the closed position, wherein said third coupling element is configured in such a way that the first and second electrical connectors can be transferred from the safety state to the fixed state by a rotational adjusting movement of the coupling lever from the safety position to the closed position, and wherein the coupling lever is prevented from performing the rotational adjustment motion in the open position by cooperation with the first electrical connector and with the second electrical connector in the loose state thereof and the coupling lever is prevented from performing the rotational adjustment motion in the closed position by cooperation with the first electrical connector and with the second electrical connector in the fixed state thereof.

2. The electrical connecting device according to claim 1, wherein the adjusting movement of the coupling lever out of the safety position into the closed position relative to the first electrical connector is a rotational movement.

3. The electrical connecting device according to claim 1, wherein the coupling lever is prevented from performing a translational movement in the closed position.

4. The electrical connecting device according to claim 1, wherein a latch is provided between the coupling lever and the first electrical connector and the second electrical connector which has to be overcome on reaching and leaving the open position, the safety position, and the closed position.

5. The electrical connecting device according to claim 1, wherein the first coupling element of the first electrical connector comprises a pin, wherein the third coupling element of the coupling lever comprises a slot having a first and a second end in which the pin engages, and wherein the pin and the slot are designed in relation to each other in such a way that the coupling lever is rotatable about the pin when the pin is located at the second end of the slot, and not rotatable when the pin is located at a first end of the slot.

6. The electrical connecting device according to claim 5, wherein the first coupling element of the first electrical connector comprises a guide peg, wherein the third coupling element of the coupling lever comprises a guide groove in which the guide peg engages, wherein the guide groove comprises a straight section and an arcuate section, and wherein the guide peg is arranged at a junction between the straight and arcuate sections when the coupling lever is in the safety position.

7. The electrical connecting device according to claim 6, wherein the arcuate section of the guide groove is at a constant distance from the first end of the slot.

8. The electrical connecting device according to claim 6, wherein a length of the straight section of the guide groove is shorter than a length of the arcuate section.

9. The electrical connecting device according to claim 6, wherein a latch provided between the first electrical connector and the coupling lever is designed as narrow portions of the guide groove, as a result of which the guide peg latches in at one end of the guide groove, at another end of the guide groove or at the junction between the arcuate and straight sections.

10. The electrical connecting device according to claim 6, wherein the second coupling element of the second electrical connector comprises a coupling peg, wherein the third coupling element of the coupling lever comprise a coupling groove in which the coupling peg engages, wherein the coupling groove comprises a straight section and an arcuate section, and wherein the coupling peg is arranged at a junction between the straight and arcuate sections when the coupling lever is in the safety position.

11. The electrical connecting device according to claim 10, wherein the arcuate section of the coupling groove, starting from the junction between the arcuate and straight sections, is at a decreasing distance from the first end of the slot.

12. The electrical connecting device according to claim 10, wherein a length of the straight section of the coupling groove is-shorter than a length of the arcuate section.

13. The electrical connecting device according to claim 10, wherein the slot, the straight section of the guide groove and the straight section of the coupling groove are oriented in the same direction and have the same length.

* * * * *